United States Patent [19]

Davies et al.

[11] Patent Number: 5,561,826
[45] Date of Patent: Oct. 1, 1996

[54] CONFIGURABLE ARCHITECTURE FOR SERIAL COMMUNICATION

[75] Inventors: Eric Davies; Daun Langston, both of Grass Valley, Calif.

[73] Assignee: Silicon Systems, Inc., Tustin, Calif.

[21] Appl. No.: 526,200

[22] Filed: Sep. 11, 1995

Related U.S. Application Data

[63] Continuation of Ser. No. 417,725, Apr. 6, 1995, abandoned, which is a continuation of Ser. No. 189,290, Jan. 31, 1994, abandoned, which is a continuation of Ser. No. 528,960, May 25, 1990, abandoned.

[51] Int. Cl.⁶ .................................................. G06F 13/00
[52] U.S. Cl. ................ 395/891; 395/250; 364/239.2; 364/260.4; 364/260; 364/DIG. 1
[58] Field of Search ................................ 395/200, 275, 395/882, 886, 891, 892, 893, 288; 364/200, 900

[56] References Cited

U.S. PATENT DOCUMENTS

| | | |
|---|---|---|
| 4,006,457 | 2/1977 | Hepworth et al. . |
| 4,071,887 | 1/1978 | Daly et al. . |
| 4,156,932 | 5/1979 | Robinson et al. . |
| 4,187,394 | 2/1980 | Sievers .................................. 178/58 |
| 4,509,113 | 4/1985 | Heath . |
| 4,682,304 | 7/1987 | Tierney . |
| 4,823,312 | 4/1989 | Michael et al. ...................... 364/900 |
| 4,841,440 | 6/1989 | Yonezu et al. ....................... 364/200 |
| 4,843,389 | 6/1989 | Lisle et al. ........................... 341/106 |
| 4,930,065 | 5/1990 | McLagan et al. . |
| 4,964,124 | 10/1990 | Burnett . |
| 4,982,325 | 1/1991 | Tignor et al. ........................ 364/200 |
| 5,063,494 | 11/1991 | Davidowski et al. . |
| 5,134,691 | 7/1992 | Elms . |
| 5,179,661 | 1/1993 | Copeland, III et al. ............. 395/250 |

*Primary Examiner*—Christopher B. Shin
*Attorney, Agent, or Firm*—Hecker & Harriman

[57] ABSTRACT

A device for coupling a host computer to a serial communications device. A dual port register set is coupled to the CPU bus of a host computer. The dual port registers receive the control signals and data from the host computer. This information is immediately available to be read by a serial communications controller. In this invention, one channel of a two-channel serial communications controller is implemented to receive the parallel data and convert it to serial output. The parallel data is also provided directly to a microprocessor interface for use by a local microprocessor, if desired. The present invention eliminates unneeded conversion steps and reduces the amount of circuitry required to implement serial communications functions.

20 Claims, 7 Drawing Sheets

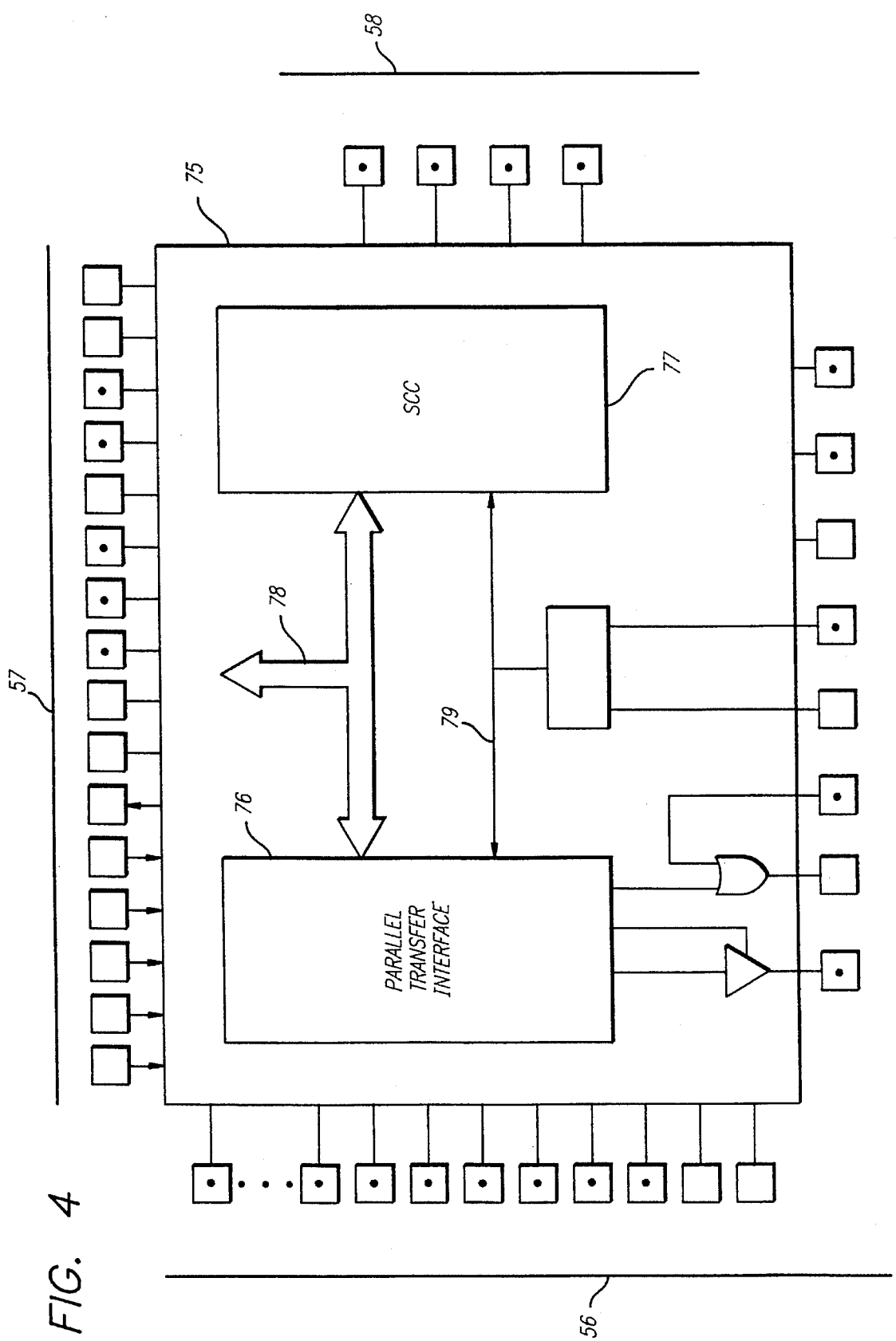

FIG. 5A

| REGISTER | | ADDRESS A2-A0 | DATA BIT NUMBER | | | | | | | |
|---|---|---|---|---|---|---|---|---|---|---|
| | | | D7 | D6 | D5 | D4 | D3 | D2 | D1 | D0 |
| RECEIVER BUFFER REGISTER (READ ONLY) | RBR | 0 DLAB=0 | BIT 7 (MSB) | BIT 6 | BIT 5 | BIT 4 | BIT 3 | BIT 2 | BIT 1 | BIT 0 (LSB) |
| TRANSMIT HOLDING REGISTER (WRITE ONLY) | THR | 0 DLAB=0 | BIT 7 (MSB) | BIT 6 | BIT 5 | BIT 4 | BIT 3 | BIT 2 | BIT 1 | BIT 0 (LSB) |
| INTERRUPT ENABLE REGISTER | IER | 1 DLAB=0 | 0 | 0 | 0 | 0 | ENABLE MODEM STATUS | ENABLE RECEIVER STATUS | ENABLE THRE | ENABLE RDA |
| INTERRUPT ID REGISTER (READ ONLY) | IIR | 2 | FIFOS ENABLED | FIFOS ENABLED | SSI ENABLE (SINGLE CS) | REGISTER SELECT 0 (SINGLE CS) | INTERRUPT ID 2 | INTERRUPT ID 1 | INTERRUPT ID 0 | "0" IF INTERRRUPT PENDING |
| FIFO CONTROL REGISTER (WRITE ONLY) | FCR | 2 | RCVR TRIGGER 1 | RCVR TRIGGER 0 | XMIT TRIGGER 1 (SSI ENABLE) | XMIT TRIGGER 0 (SSI ENABLE) | DMA MODE SELECT | XMIT FIFO RESET | RCVR FIFO RESET | FIFO ENABLE |
| LINE CONTROL REGISTER | LCR | 3 | DIVISOR LATCH ACCESS (DLAB) | SET BREAK | STICK PARITY | EVEN PARITY | PARITY ENABLE | NUMBER STOP | WORD LENGTH SELECT 1 | WORD LENGTH SELECT 0 |
| MODEM CONTROL REGISTER | MCR | 4 REGSEL=0 | 0 | 0 | 0 | LOOP | ENABLE INTERRUPT | UPRST | RTS | DTR |
| LINE STATUS REGISTER | LSR | 5 REGSEL=0 | ERROR IN RECEIVE FIFO | TRANSMIT EMPTY | TRANSMIT HOLDING EMPTY | BREAK INTERRUPPT (BI) | FRAMING ERROR (FE) | PARITY ERROR (PE) | OVERRUN ERROR (OE) | DATA READY (DR) |
| MODEM STATUS REGISTER | MSR | 6 REGSEL=0 | DCD | RI | DSR | CTS | DELTA DCD | TRAILING EDGE RI | DELTA DSR | DELTA CTS |
| SCRATCH REGISTER | SCR | 7 REGSEL=0 | BIT 7 | BIT 6 | BIT 5 | BIT 4 | BIT 3 | BIT 2 | BIT 1 | BIT 0 |
| DIVISOR LATCH (LS) | DLL | 0 DLAB=1 | BIT 7 | BIT 6 | BIT 5 | BIT 4 | BIT 3 | BIT 2 | BIT 1 | BIT 0 |
| DIVISOR LATCH (MS) | DLM | 1 DLAB=1 | BIT 15 | BIT 14 | BIT 13 | BIT 12 | BIT 11 | BIT 10 | BIT 9 | BIT 8 |

FIG. 5B

| REGISTER | | ADDRESS UCR[3:0] | D7 | D6 | D5 | D4 | D3 | D2 | D1 | D0 |
|---|---|---|---|---|---|---|---|---|---|---|
| | | | | | | DATA BIT NUMBER | | | | |
| UART COMMAND REGISTER (WRITE ONLY) | UCR | D/C=A/B=0 ONECS=1; D/C=0 RS=1 RGSEL0=1 | 0 | 0 | 0 | 0 | REGISTER SELECT 3 | REGISTER SELECT 2 | REGISTER SELECT 1 | REGISTER SELECT 0 |
| RECEIVER BUFFER REGISTER (READ ONLY) | RBR | 8 OR D/C=A/B=0 | BIT 7 (MSB) | BIT 6 | BIT 5 | BIT 4 | BIT 3 | BIT 2 | BIT 1 | BIT 0 (LSB) |
| TRANSMIT HOLDING REGISTER (WRITE ONLY) | THR | 8 OR D/C=A/B=0 | BIT 7 (MSB) | BIT 6 | BIT 5 | BIT 4 | BIT 3 | BIT 2 | BIT 1 | BIT 0 (LSB) |
| INTERRUPT ENABLE REGISTER | IER | 1 | 0 | 0 | 0 | ENABLE EXTERNAL INT (SP=1) | ENABLE MCR/SCR STATUS | ENABLE DIVISOR/LCR STATUS | ENABLE THRE | ENABLE RDA/OE |
| INTERRUPT ID REGISTER (READ ONLY) | IIR | 2 | 0 | 0 | 0 | 0 | 0 | INTERRUPT ID 2 | INTERRUPT ID 1 | INTERRUPT ID 0 |
| LINE CONTROL REGISTER (READ ONLY) | LCR | 3 | 0 | SET BREAK | STICK PARITY | EVEN PARITY | PARITY ENABLE | NUMBER STOP | WORD LENGTH SELECT 1 | WORD LENGTH SELECT 0 |
| MODEM CONTROL REGISTER (READ ONLY) | MCR | 4 | 0 | 0 | 0 | LOOP | 0 | 0 | RTS | DTR |
| LINE STATUS REGISTER | LSR | 5 | 0 | 0 | TRANSMIT HOLDING READY (READ ONLY) | CH B TX TRANSMIT BREAK (READ/WRITE) | CH B TX FRAMING ERROR (READ /WRITE) | CH B TX PARITY ERROR (READ /WRITE) | CH B RX OVERRUN ERROR (READ ONLY) | CH B RX DATA READY (READ ONLY) |
| MODEM STATUS REGISTER (READ/WRITE) | MSR | 6 | DCD | RI | DSR | CTS | 0 | 0 | 0 | 0 |
| SCRATCH REGISTER | SCR | 7 | BIT 7 | BIT 6 | BIT 5 | BIT 4 | BIT 3 | BIT 2 | BIT 1 | BIT 0 |
| DIVISOR LATCH (LS) (READ ONLY) | DLL | 9 | BIT 7 | BIT 6 | BIT 5 | BIT 4 | BIT 3 | BIT 2 | BIT 1 | BIT 0 |
| DIVISOR LATCH (MS) (READ ONLY) | DLM | A | BIT 15 | BIT 14 | BIT 13 | BIT 12 | BIT 11 | BIT 10 | BIT 9 | BIT 8 |
| CONFIG. CONTROL REGISTER | CCR | B | 16C550 PARALLEL ENABLE (SP=1) | 0 | 0 | OSC OFF | DIVISOR PRESCALE 3 | DIVISOR PRESCALE 2 | DIVISOR PRESCALE 1 | DIVISOR PRESCALE 0 |

FIG. 5C

| REGISTER | ADDRESS WR0[3:0] D/C=0 A/B=1 ONECS: RS=1 RGSEL0=1 | D7 | D6 | D5 | DATA BIT NUMBER D4 | D3 | D2 | D1 | D0 |
|---|---|---|---|---|---|---|---|---|---|
| COMMAND REGISTER | WR0 | CRC RESET 1 | CRC RESET 0 | COMMAND CODE 2 | COMMAND CODE 1 | COMMAND CODE 0 | REGISTER SELECT 2 | REGISTER SELECT 1 | REGISTER SELECT 0 |
| TX/RX INTERRUPT DATA TRANSFER | WR1 1 (WRITE ONLY) | 0 | 0 | 0 | RECEIVE INTERRUPT MODE 1 | RECEIVE INTERRUPT MODE 0 | PARITY SPECIAL | TX INT ENABLE | EXTERNAL INTERRUPT ENABLE |
| INTERRUPT VECTOR REGISTER | WR2 RR2 2 (READ/WRITE) | BIT 7 (MSB) | BIT 6 | BIT 5 | BIT 4 | BIT 3 | BIT 2 | BIT 1 | BIT 0 (LSB) |
| RECEIVE CONTROL | WR3 3 (WRITE ONLY) | RX BITE/CHAR 1 | RX BITE/CHAR 0 | AUTO ENABLE | ENTER HUNT MODE | RX CRC ENABLE | ADDRESS SEARCH MODE (SDLC) | SYNC CHAR LOAD INHIBIT | RECEIVER ENABLE |
| TX/RX MISC MODES | WR4 RR4 4 (READ/WRITE) | CLOCK RATE 1 | CLOCK RATE 0 | SYNC MODE 1 | SYNC MODE 0 | STOP BITE 1 | STOP BITE 0 | EVEN PARITY | PARITY ENABLE |
| TRANSMIT CONTROL | WR5 RR5 5 (READ/WRITE) | DTR | TX BITE/ CHAR 1 | TX BITE/ CHAR 0 | SEND BREAK | TRANSMIT ENABLE | SDLC/ CRC-16 | RTS | TX CRC ENABLE |
| SYNC CHAR OR SDLC ADDRESS | WR6 RR6 6 (READ/WRITE) | BIT 7 | BIT 6 | BIT 5 | BIT 4 | BIT 3 | BIT 2 | BIT 1 | BIT 0 |
| SYNC CHAR OR SDLC FLAG | WR7 RR7 7 (READ/WRITE) | BIT 7 | BIT 6 | BIT 5 | BIT 4 | BIT 3 | BIT 2 | BIT 1 | BIT 0 |
| TRANSMIT BUFFER REGISTER | WR8 8 D/C=A/B=1 (WRITE ONLY) | | | | | | | | |
| MASTER INTERRUPT CONTROL | WR9 RR9 9 (READ/WRITE) | RESET COMMAND 1 | RESET COMMAND 0 | 0 | STATUS HIGH | MASTER INTERRUPT ENABLE (MIE) | 0 | 0 | VECTOR INCLUDES STATUS |
| TX/RX MISC CONTROL | WR10 10 (WRITE ONLY) | CRC PRESET | DATA ENCODING 1 | DATA ENCODING 0 | GO ACTIVE ON POLL | MARK IDLE | ABORT ON UNDERRUN | LOOP | 6 BIT SYNC |
| CLOCK MODE CONTROL | WR11 RR11 11 (READ/WRITE) | MANCHESTER ENCODE TRANSMIT | RECEIVE CLOCK SOURCE 1 | RECEIVE CLOCK SOURCE 0 | TRANSMIT CLOCK SOURCE 1 | TRANSMIT CLOCK SOURCE 0 | TRXC PIN OUTPUT | TRXC OUTPUT SOURCE 1 | TRXC OUTPUT SOURCE 0 |
| LOWER BYTE BAUD GENERATOR | WR12 RR12 12 (READ/WRITE) | BIT 7 | BIT 6 | BIT 5 | BIT 4 | BIT 3 | BIT 2 | BIT 1 | BIT 0 |
| UPPER BYTE BAUD GENERATOR | WR13 RR13 13 (READ/WRITE) | BIT 15 | BIT 14 | BIT 13 | BIT 12 | BIT 11 | BIT 10 | BIT 9 | BIT 8 |
| MISC CONTROL | WR14 RR14 14 (READ/WRITE) | PLL COMMAND 2 | PLL COMMAND 1 | PLL COMMAND 0 | LOCAL LOOPBACK | AUTO ECHO | TX CRC-32 | BAUD GENERATOR SOURCE | BAUD GENERATOR ENABLE |
| EXTERNAL/ STATUS INTERRUPT CONTROL | WR15 RR15 15 (READ/WRITE) | BREAK/ABORT INTERRUPT ENABLE | TX UNDERRUN/ EOM INT EN | CTS INT EN | SYNC/HUNT INT EN | DCD INT EN | DSR INT EN | ZERO COUNT INT EN | RI INT EN |

FIG. 5D

| REGISTER | ADDRESS WR0(3:0) | DATA BIT NUMBER | | | | | | | |
|---|---|---|---|---|---|---|---|---|---|
| | | D7 | D6 | D5 | D4 | D3 | D2 | D1 | D0 |
| TX/RX BUFFER/ EXTERNAL STATUS | RR0 / 0 | BREAK/ ABORT DETECT | TRANSMIT UNDERRUN /EOM | CTS | HUNT | DCD | TRANSMIT BUFFER EMPTY | ZERO COUNT | RECEIVE CHAR AVAIL |
| SPECIAL RECEIVE CONDITION STATUS | RR1 / 1 | END OF FRAME (SDLC) | CRC/ FRAMING ERROR | RECEIVE OVERRUN ERROR | PARITY/ CRC-32 ERROR | BIT REMAINDER 2 | BIT REMAINDER 1 | BIT REMAINDER 0 | ALL SENT |
| INTERRUPT VECTOR REGISTER | RR2 / 2 | BIT 7 (MSB) | BIT 6 | BIT 5 | BIT 4 | BIT 3 | BIT 2 | BIT 1 | BIT 0 (LSB) |
| INTERRUPT PENDING REGISTER | RR3 / 3 | 0 | 0 | CH A RECEIVE INT PENDING | CH A TRANSMIT INT PENDING | CH A EXT/STAT INT PENDING | CH B INTERRUPT ID 2 | CH B INTERRUPT ID 1 | CH B INTERRUPT ID 0 |
| RECEIVE DATA REGISTER | RR8 / 8 D/C=1 A/B=1 | BIT 7 | BIT 6 | BIT 5 | BIT 4 | BIT 3 | BIT 2 | BIT 1 | BIT 0 |
| MISC STATUS | RR10 / 10 | ONE CLOCK MISSING | TWO CLOCKS MISSING | DSR | LOOP SENDING | CRC16 | CRC32 | ON LOOP | RI |

CONFIGURABLE ARCHITECTURE FOR SERIAL COMMUNICATION

This is a continuation of U.S. patent application Ser. No. 08/417,725, filed Apr. 6, 1995, now abandoned, which is a continuation of U.S. patent application Ser. No. 08/189,290, filed Jan. 31, 1994, now abandoned, which is a continuation of U.S. patent application Ser. No. 07/528,960, filed May, 25, 1990, now abandoned.

BACKGROUND OF THE INVENTION

1. Field of the Invention

This invention relates to the field of universal synchronous-asynchronous receiver / transmitters (UART).

2. Background Art

Computers or other processing units are often coupled to peripheral devices such as printers, communication devices, etc. A communication program executed on the host computer controls the transfer of data from the host computer to the communications device. The central processing unit (CPU) or processor of the host computer implements the transmission of the data from memory to the communications device. A processor generally receives and transmits data in parallel. However, peripheral devices generally require serial data streams. When a communication device is coupled to a computer processor, the parallel output of the computer processor is first converted to serial output and provided through a serial port to the peripheral device. The peripheral device then operates on the serial data stream. For example, if the peripheral device is a modem, the serial data stream is modulated and transmitted on a transmission line.

Many communication devices such as modems or protocol converters are "intelligent," that is, they have their own processing means built in. When such an intelligent device receives a serial data stream, it converts the serial data stream to a parallel data stream for processing. Therefore, when a computer communicates with a peripheral device through a serial port, the data stream undergoes a parallel to serial to parallel conversion. The prior art methods of this parallel to serial to parallel conversion require dedicated hardware and software. In addition, special effort is required to perform format identification (data rate, parity, etc.). Known patterns are required and formats are often limited. This conversion also limits the maximum data rate.

These communication devices perform protocol conversion, perform command interpretation, data formatting, data modification and/or electrical format conversion (such as a modem). Typically, a processor is used to supervise the conversion function, using conversion hardware. A parallel port is usually used to communicate with the computer bus. The typical method for implementing the conversion function is to provide a device to perform a standard interface to a central CPU and convert the data to a serial format. This serial data is then converted to a format for use by the device processor, which then uses yet another device to implement the protocol conversion. This method requires three conversion blocks in multiple devices with each conversion block using hardware, software and often placing restrictions on the data.

Therefore, it is an object of the present invention to provide a universal and configurable architecture for serial communications.

It is another object of the present invention to eliminate one of the conversion steps and, in particular, the serial conversion step of communication between a computer and a communication device such as a modem.

It is still another object of the present invention to provide a method and apparatus for converting parallel data and to implement protocol conversion on such data.

SUMMARY OF THE INVENTION

This invention provides a method and apparatus for communication between a computer and peripheral device without requiring parallel to serial conversion while still allowing all registers to be read directly by the processor of the communications device.

A configurable architecture for serial communications provides multiple ports for data transfer. One register block performs data and control storage to communicate between the first and second ports. A second block is a serial communications controller (SCC) with its own data control storage and features to implement the necessary protocol. The SCC is controlled through the second port and the serial data appears on the third port. The first interface conforms to a standardized hardware interface required for most configurations. This provides an architecture of flexibility optimizing a configuration for each requirement using the same basic blocks while still maintaining an interface compatible with standard requirements.

The invention also utilizes a multi-port architecture with a first parallel port interfacing with a computer bus, a second parallel port coupled to a device processor (to control protocol conversion) and a third serial port, which is the output of the protocol converter. Data written to the first port is transferred unmodified to the second port. The controller, using the second port, then transfers the data to the conversion hardware. The intermediate output is provided on the third port. The controller may add, delete or modify data, as necessary. This achieves economy and efficiency by combining previously distinct blocks into a single package. It simplifies communication of information from the computer bus to the processor and provides a path for flow of information outside of the data stream, such as data format or signalling signals.

BRIEF DESCRIPTION OF THE DRAWINGS

FIG. 4 is a block diagram of one embodiment of this invention.

FIG. 5A illustrates the mapping of the 550 register set of one embodiment of this invention.

FIG. 5B illustrates the mapping of the channel B registers of one embodiment of this invention.

FIG. 5C illustrates the mapping of the channel A write registers of one embodiment of this invention.

FIG. 5D illustrates the mapping of the channel A read registers of one embodiment of this invention.

DETAILED DESCRIPTION OF THE INVENTION

A method and apparatus for serial communication is described. In the following description, numerous specific details, such as number of bits, number of registers, etc., is set forth in detail in order to provide a more thorough description of this invention. It will be apparent, however, to one skilled in the art, that this invention may be practiced without these specific details. In other instances, well known features have not been described so as not to unnecessarily obscure this invention.

Figure 1:
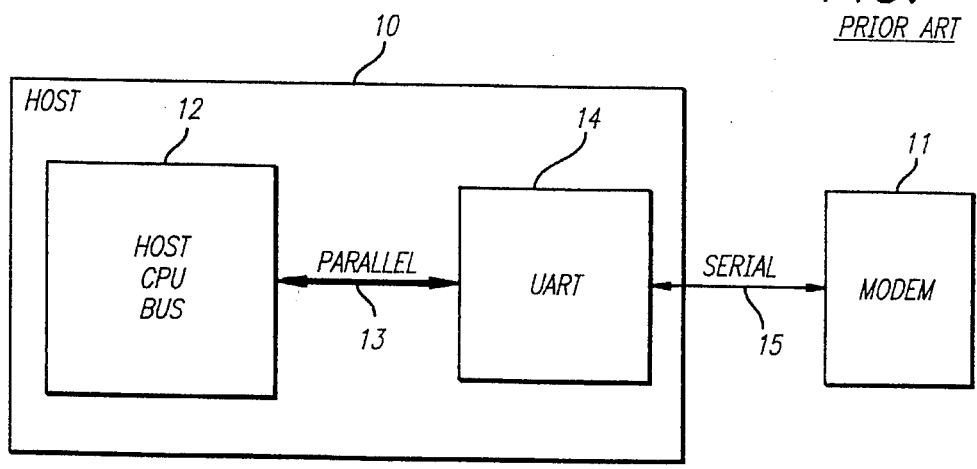
FIG. 1 is a block diagram of one prior art processor/communications device interface.

FIG. 1 illustrates a prior art host/communications device system. A host computer, generally indicated by dashed line 10, includes in part a CPU bus 12. The CPU bus 12 provides a parallel output 13 to a UART 14. The UART converts the parallel stream into a serial stream 15 for output through a serial port. The serial stream 15 is connected via the serial port to an external communications device such as modem 11.

The UART 14 may be implemented with a device such as the SSi 73M550 UART, manufactured by Silicon Systems, Inc., of Tustin, Calif., assignee of the present patent application. This device, and others like it, shall be referred to herein as "550 type devices" or "550 type UART's".

Often, a communications device such as a modem, is "intelligent," that is, the modem includes a processing means such as a microprocessor for improving the performance of the device. A microprocessor generally requires data in a parallel format. Therefore, present day communication devices include a second converting means for converting the serial output of a 550 UART to parallel data for use by the processor. The processor provides parallel output which then must be reconverted to serial data for eventual transmission by the modem.

In the prior art, the conversion of the serial output of the 550 UART into a parallel format is often accomplished by use of a serial communications controller (SCC) such as the Z8530 SCC manufactured by Zilog. Other manufacturers produce SCC devices which operate identically to or compatible with the Z8530 SCC. In this application, such devices are referred to as 8530-type SCC devices or 8530-type controllers. The 8530 SCC typically includes two full duplex channels. That is, each channel can receive serial data and convert it to parallel or receive parallel data and convert it to serial. These channels are referred to as channel A and channel B.

In the following description, this invention is described as providing the functionality of a 550 type register set and an 8530 SCC, but using less circuitry than prior art 550 devices and 8530 devices. However, the description is for purposes of example only. This invention provides a method and apparatus for providing the functionality and interface of any serial communications device register set and further provides the functionality of any parallel to serial converting device.

The invention emulates the interface of standard serial communications devices. The invention also provides a means for enhancing the functionality of these standard devices. The converting means is used to implement a plurality of protocols for serial communication, such as monosync, bisync, HDLC and SDLC.

Figure 2:
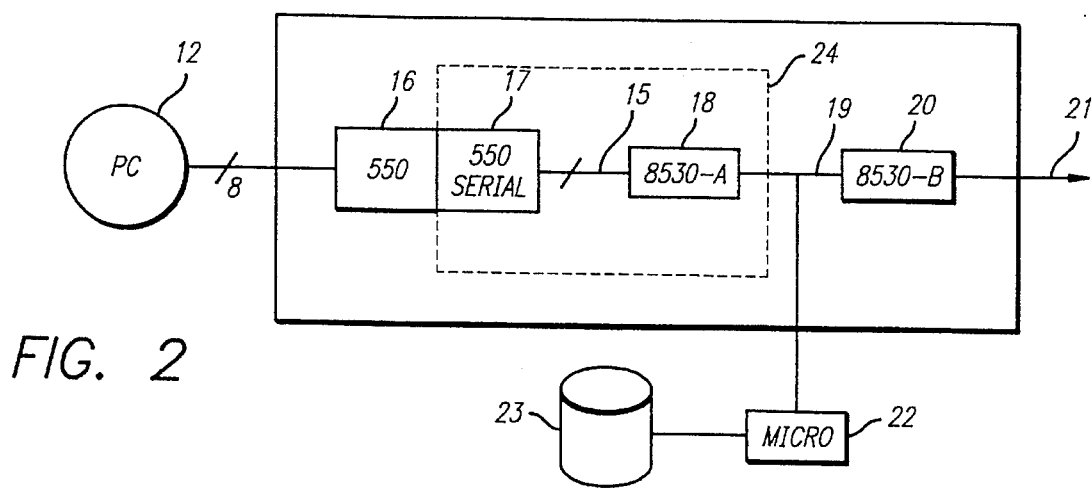
FIG. 2 is a block diagram of another prior art processor/communications interface.

An example of a prior art scheme implementing a 550 UART and an 8530 SCC in connection with a microprocessor is illustrated in FIG. 2. A CPU bus 12 is coupled to a 550 UART. The 550 UART consists of two components, a 550 register set 16 and a 550 serializer 17. The 550 register set 16 receives the parallel data from the CPU bus 12 and provides it to the serializer 17 for conversion to serial output. The serial output 15 of the 550 UART is provided to one channel of an 8530 SCC such as channel A block 18.

The 550 register set consists of a number of registers for receiving data from the host computer CPU bus. Typically, these registers include a receiver buffer register, line control register, divisor latch registers, line status registers, transmitter holding register, modem control register, modem status register, interrupt enable register, interrupt ID register and FIFO control register. After data has been provided to these registers, it is provided to the serializer for conversion to a serial stream.

The 8530-A block 18 (channel A of the SCC) converts the serial data to parallel data and provides a parallel output on bus 19. A microprocessor 22 is coupled to bus 19 to receive the parallel data and perform any required processing. The microprocessor 22 has associated memory 23 which may be disk storage, RAM or any other suitable storage means. The processed parallel data from microprocessor 22 is then provided to 8530-B block 20 (channel B of the SCC) for conversion to serial output 21. Serial output 21 is provided to a communications device such as a modem pump.

This invention integrates the register set of a 550 UART with one channel of an 8530 SCC. Many application programs written for personal computers and other types of computers are designed to communicate with 550 type UART's or UART's compatible with 550 type UART's. In particular, communications programs designed to communicate or to transmit data on a modem are written to communicate the data to a 550 UART register set for conversion to serial format. Therefore, this invention emulates the register set of a 550 type UART, but does not require all of the circuitry associated with a prior art 550 type UART. The invention also combines the functionality of an 8530 SCC without all of the circuitry associated with a prior art SCC. Whenever data or format information is written to the device, the local processor is notified. When the local processor reads the data, the device informs the host computer that the data has been serially transferred. This also applies to any status/control signals that are provided.

A block diagram of one embodiment of the invention is illustrated in FIG. 4. The serial packet controller 75 has two primary blocks, the parallel transfer interface block 76 and the serial communications controller "SCC" block 77. The parallel transfer interface block 76 emulates the 550 UART register set. The interface block contains fully buffered registers (16 byte FIFO) and provides a parallel communications path between two processors (or between two application programs). The parallel transfer interface block 76 maintains parallel data from the host computer in parallel format. However, the host computer can operate as if it is writing to a 550 UART parallel-to-serial converter. The interface block 76 provides parallel output 78 to the SCC block 77 and to port 57 for communication to a microprocessor.

The SCC block 77 implements one channel (e.g., channel A) of an 8530-type SCC. SCC block 77 is a multi-protocol communications block that can be used for a variety of serial communications functions. It provides asynchronous and synchronous formats such as monosync, bisync, HDLC and SDLC. The block includes a baud rate generator, digital phase lock loop for clock recovery and a 3-byte FIFO on the transmit and receive blocks.

The parallel transfer interface block 76 receives parallel data through port 56 from a host computer CPU bus. The configuration of FIG. 4 is a three port configuration. The parallel output of the parallel transfer interface block 76 is provided on bus 78 to port 57 (to a local microprocessor, for example). The SCC block 77 provides serial output through port 58.

Figure 3B:
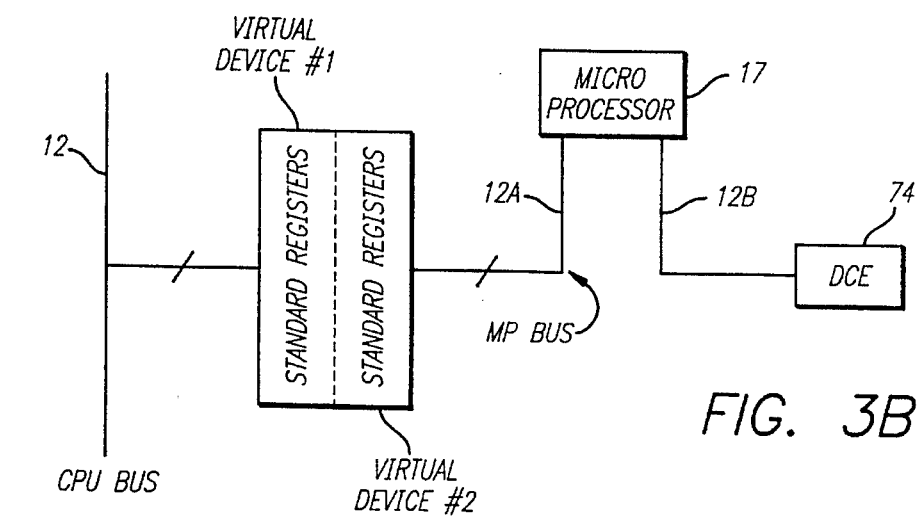
FIG. 3B is an example of the invention of FIG. 3A in a computer environment.
Figure 3A:
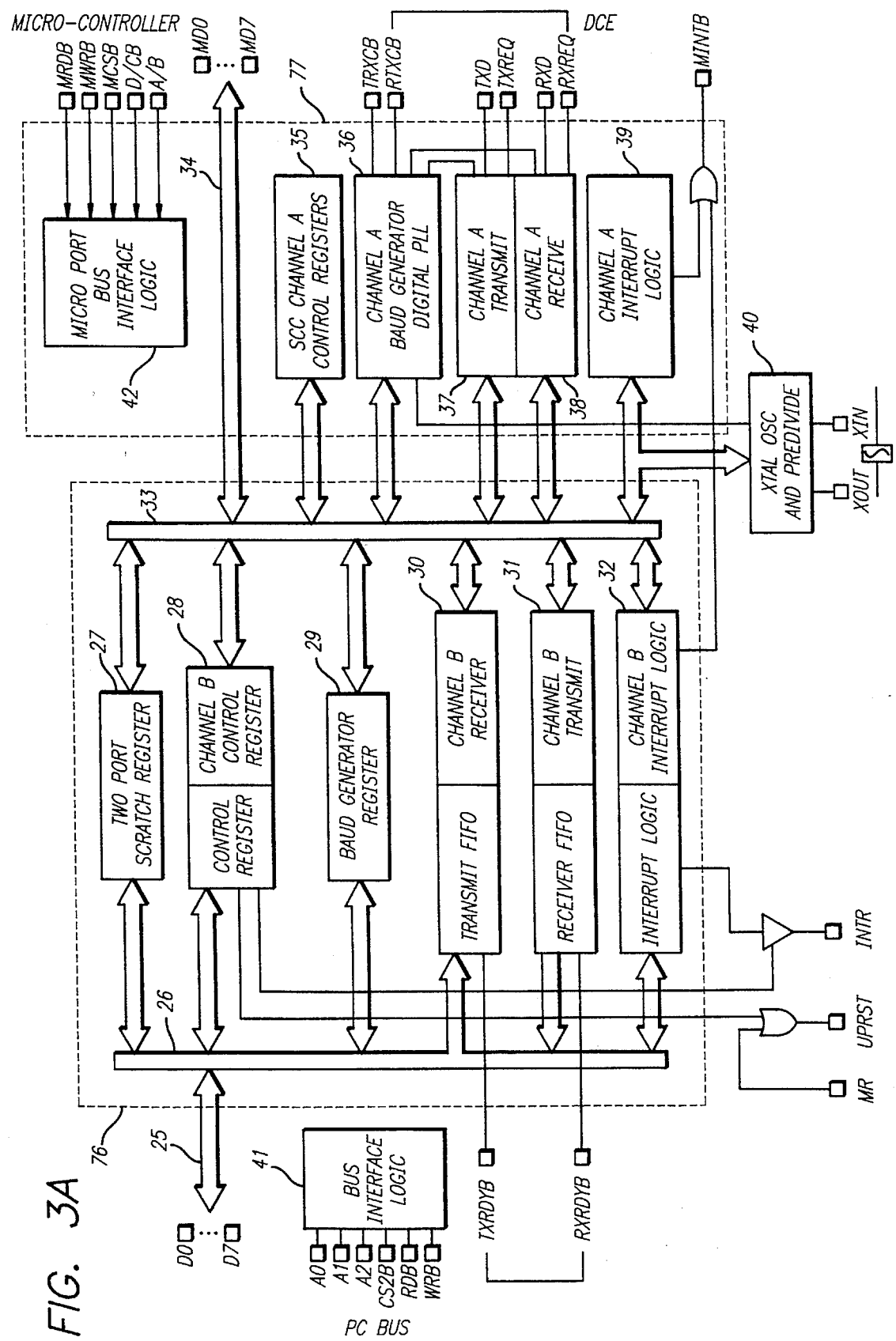
FIG. 3A is a block diagram of a serial communications emulator of the present invention.

FIG. 3A is a detailed block diagram of the device of FIG. 4. The device emulates two serial communications devices. These devices are the 550 register set, identified by dashed line 76 and the SCC block identified by dashed line 77.

550 REGISTER BLOCK 76

The 550 register set block 76 is coupled directly to a host computer CPU through bus 25 and bus interface logic 41. Bus 25 receives data bits D0–D7 in parallel and provides parallel output to bus 26. The bus interface logic 41 receives control signals from the PC bus and provides them to bus 26.

The 550 register block 76 utilizes a number of registers to emulate the register set of a 550 type UART. In this invention, dual port registers are utilized so that data written into a register may be read onto a second bus 33. The registers of the 550 register block 76 are a scratch register 27, control registers 28, baud generator register 29, transmit register 30, receive register 31 and interrupt logic register 32.

The scratch register 27 provides a communication path outside the data path. In the prior art, modem protocol is based on the fact there is no control path outside the data path. The AT command set (auto sync and auto stream) are implemented because there is no control path outside the data path. The scratch register 27 can be used for such a control path.

A control register block 28 is shown symbolically as two separate registers; a 550 control register and a channel B control register. In the preferred embodiment of this invention, register 28 is a single dual port register. However, the dual port register may be utilized as if it were, in fact, two separate registers. Control information from the host computer can be written to the control register block 28. Data written to the register block 28 can immediately be read onto bus 33 by the SCC block 77. Bus block 28 functions as a control register for the 550 register set block 76 and as a "channel B" control register block for the SCC block 77.

As noted previously, an SCC block in the prior art has two channels, channel A and channel B. In this invention, the SCC block 77 implements one channel, channel A, of the prior art SCC. The 550 registers, which are readable by the SCC block 77 are referred to in this invention as the "channel B" registers.

Referring again to the 550 register set block 76, a baud generator register 29 is coupled to bus 26 and bus 33. The baud generator register 29 receives the baud rate signals from the PC bus. An applications program communicating through the communications device data identifies a selected baud rate for transmitting data, e.g. 300 baud, 1,200 baud, 2,400 baud, etc. This invention is not limited to such baud rates, but is limited only by the bus speed of the host computer. In the prior art, communications were limited by the channel speed, that is, the channel for converting serial data to parallel data. It may be that the application program communicating with the present invention has a maximum communication speed of 2,400 baud. However, the bus speed of the host computer may be much greater than 2,400 baud. Even so, the application program must receive a confirmation that communication is occurring at the desired rate. By intercepting the baud rate in the baud generator register 29, a confirmation signal can be generated and provided to the application program, even though communication is occurring at a higher rate.

The transmit register 30 is implemented with a first in-first out (FIFO) register. The register 30 receives transmit data information from bus 26 and therefore emulates a 550 type UART transfer register. This data is immediately available to be read onto bus 33, and therefore register 30 emulates a channel B receive register of an 8530 type device. The output of register 30 is provided to bus 33.

Similarly, register 31 emulates a receive FIFO for a 550 type UART and a transmit FIFO for channel B of an 8530 device. The interrupt logic register 32 provides interrupts to the host computer and to the local microprocessor whenever data is provided to any of the registers.

The control registers 28 of this invention emulate a number of registers in a typical 550 type UART, such as the SSi 73M550. The registers 28 emulate line control registers, divisor latch registers, line status registers, modem control registers, modem status registers, and FIFO control registers of a 550 UART. However, the implementation of this invention allows a number of elements of a prior art 550 type UART to be eliminated. In particular, receiver shift registers, receiver timing and control, baud rate generators, transmitter timing control, transmitter shift registers and modem control logic hardware are eliminated in the 550 register block of this invention. The functionality of those elements are implemented in the 8530 block 77.

8530 SCC block 77

The 8530 block (or SCC block 77) includes a microport bus interface logic block 42 for communicating with a local microprocessor. A bus 34 can provide the parallel data bits D0–D7 directly to the local microprocessor. The SCC control registers 35 are coupled to bus 33 to receive data and control signals. Baud generator/digital PLL block 36 is a clock generator. It includes a baud rate generator that can be written to the baud generator register 29. A digital phase lock loop is implemented to recover clock signals encoded in data.

The transmit and receive channels 37 and 38 are the actual engines that implement the particular protocols, receive bits that come out of the control register 35, and provide appropriate output. The blocks control the communication format, for example, synchronous, asynchronous, bisync, monosync, HDLC and SDLC formats can all be implemented in this invention. Block 39 is the channel A interrupt logical block. A crystal oscillator and pre—divide block 40 implements a programmable frequency generator.

FIGS. 5A through 5D illustrate the register mapping of this invention. Each register and an associated abbreviation are identified in the first two columns of FIGS. 5A–5D. The third column identifies the address of the register and the remaining eight columns identify the data bit number values for each register. This mapping provides a standard interface to application programs written to communicate with a 550 type UART. For example, prior art applications programs are written to write to eight address locations in a specific memory location. This invention provides that all three register sets fit into the eight address locations.

FIG. 5A illustrates the register mapping of the 550 registers. FIG. 5B illustrates the register mapping of the channel B registers. In this invention, the 550 registers and channel B registers are implemented with a single dual port register. Certain of the registers are shared and certain address locations are shared so this invention maps the registers to take advantage of this overlap. Referring to FIG. 5A, a "loop" mode is enabled by setting the appropriate bit (D4) of the modem control register. Referring now to FIG. 5B, the same bit (D4) of the modem control register is a loop enable location. Note that the modem control register of channel B is "read only". This is because the 550 register set and channel B registers are implemented as single dual port registers. The 550 registers are written to by the host CPU bus. The data is then available to be read onto bus 33 as if reading from the channel B registers of an 8530 device.

The configuration control register of FIG. 5B is located in the predivide block 40 of FIG. 3A.

FIGS. 5C and 5D illustrate the mapping of the SCC block channel A write and read registers respectively.

The device of FIG. 3A provides compatibility with applications written for 550 UART's. However, the device does not contain a transmitter, receiver, or a baud rate generator. Thus, the device can be implemented with less circuitry than prior art solutions. The registers are fully buffered (16 byte FIFO) and provide a communications path between two processors or between two programs.

An application of the invention of FIG. 3A is illustrated in FIG. 3B. Virtual device 1 (the 550 register set) is coupled to CPU bus 12. Virtual device 1 provides parallel data to virtual device 2 (the SCC block). Virtual device 2 outputs this parallel data on a microprocessor bus 12A to the communications device microprocessor 17. The microprocessor 17 provides output 12B to a digital communications engine (DCE) 74.

The data remains in parallel form for reading by the microprocessor 17. However, the host computer expects the data to be transferred to serial data to provide to the output device. Therefore, this invention provides a signal to the host that the data has been serially transferred. The standard device interface 21 accepts data or format information and informs the microprocessor 17 of such information. The microprocessor 17 can then operate accordingly.

This invention provides a standard device interface but does not contain any of the circuitry normally required to serialize the data since the data remains parallel. This provides hardware savings. In addition, because the data remains in parallel, operations can be performed at bus speed, greatly enhancing performance.

Devices that connect to computer buses and perform protocol conversion are required to perform many functions. Such protocol conversion may consist of simple command interpretation, data formatting, data modification or electrical format conversion such as found in a modem. Often a processor is used to supervise the conversion function. A parallel port is usually used to communicate with the computer bus. One typical method for implementing the protocol function is to provide a device to perform a standard interface to a central processing unit and convert the data to a serial format. This data is then converted to a format for use by the device processor (such as a parallel format). Another device is used to implemented the protocol conversion. This method requires three conversion blocks in a plurality of devices.

As shown in FIG. 4, this invention utilizes three ports 56, 57 and 58. The first port connects to the CPU bus 12 which is coupled to the data transfer interface block 76. The second port 57 is coupled to a microcontroller through bus 78. Bus 78 is also coupled to the data transfer interface 76 and to the SCC 77. The SCC 77 communicates through port 58 and provides converted output. The parallel port 56 communicating with the computer bus emulates a standard device. The second port 57 is a parallel port coupled to a microprocessor. The microprocessor can oversee protocol conversion. The third port 58 is the output of the SCC 77. Data written to the first port 56 is transferred unmodified to the second port 57. The controller using the second port 57 transfer the data to the conversion hardware. The output (or intermediate output) is found on the third port 58.

The present invention provides appropriate hardware for implementing various protocol conversions. The protocol conversions are implemented in software in a local microprocessor coupled to the device of this invention. Protocol, such as bisync, monosync, HDLC and SDLC, are well known in the art and are easily implemented in software.

Thus, a method and apparatus for serial communication has been described.

We claim:

1. A circuit comprising:

a first plurality of registers coupled to a first parallel port for interfacing with a processor bus of a host computer for transferring parallel data and control signals, said first plurality of registers providing said parallel data and said control signals to a first bus, wherein said first plurality of registers comprises a first-in, first-out (FIFO) register;

converting means coupled to said first bus for receiving said parallel data and said control signals and for converting said parallel data to serial data at a conversion rate, said converting means transferring said serial data to a serial port; and a second parallel port coupled to said first bus for interfacing with an optional second processing means to transfer said parallel data, wherein said optional second processing means performs protocol conversion on said parallel data without reducing said conversion rate.

2. The circuit of claim 1 wherein said plurality of registers comprise a scratch register, a control register, a baud generator register and transmit and receive registers.

3. The circuit of claim 1 wherein said converting means implements a monosync serial communication protocol.

4. The circuit of claim 1 wherein said converting means implements a bisync serial communication protocol.

5. The circuit of claim 1 wherein said converting means implements a high-level data link control (HDLC) serial communication protocol.

6. The circuit of claim 1 wherein said converting means implements a synchronous data link control (SDLC) serial communication protocol.

7. The circuit of claim 1 wherein said converting means implements a plurality of serial communication protocols, said plurality of serial communication protocols selected from a group consisting of monosync, bisync, high-level data link control (HDLC), and synchronous data link control (SDLC).

8. The circuit of claim 7 wherein said converting means also implements asynchronous serial communication.

9. The circuit of claim 1 wherein said first plurality of registers comprises a scratch register for providing a control path apart from a data path, said data path provided by other of said first plurality of registers, said control path for communicating said control signals apart from said parallel data.

10. The circuit of claim 1 wherein said converting means comprises a digital phase locked loop (PLL) for recovering clock signals.

11. The circuit of claim 1 wherein said converting means comprises a baud generator for controlling said conversion rate.

12. The circuit of claim 11 wherein said first plurality of registers comprises a baud generator register and wherein said baud generator writes said baud information to said baud generator register.

13. The circuit of claim 1 further comprising a programmable frequency generator, said programmable frequency generator comprising:

a crystal oscillator; and a pre-divide block, said crystal oscillator coupled to said pre-divide block, said pre-divide block coupled to said first bus.

14. A circuit comprising:

a first plurality of registers coupled to a first parallel port for interfacing with a processor bus of a host computer for transferring parallel data and control signals, said plurality of registers providing said parallel data and said control signals to a first bus, wherein said plurality of registers are dual port registers comprising a first-in first-out (FIFO) register;

converting means coupled to said first bus for receiving said parallel data and said control signals and for converting said parallel data to serial data at a conversion rate, said converting means transferring said serial data to a serial port;

a second parallel port coupled to said first bus for interfacing with an optional second processing means to transfer said parallel data, wherein said optional second processing means performs protocol conversion on said parallel data without reducing said conversion rate; and wherein said first plurality of registers emulates an interface of a serial communications device by providing registers having addresses of 550-type UART.

15. The circuit of claim 14 wherein said converting means comprises one channel of an 8530 device.

16. A circuit comprising:

a first plurality of registers coupled to a first parallel port for interfacing with a processor bus of a host computer for transferring parallel data and control signals, said first plurality of registers providing said parallel data and said control signals to a first bus, wherein said first plurality of registers comprises a first-in, first-out (FIFO) register;

converting means coupled to said first bus for receiving said parallel data and said control signals and for converting said parallel data to serial data at a conversion rate, said converting means transferring said serial data to a serial port; and a second parallel port coupled to said first bus for interfacing with a second processing means to transfer said parallel data, wherein said second processing means performs protocol conversion on said parallel data without reducing said conversion rate, wherein said first plurality of registers further comprises an interrupt logic register coupled to said processor bus and to said first bus for providing interrupts to said host computer and to said second processing means when said parallel data and control signals are transferred to said first plurality of registers.

17. A circuit comprising:

a first plurality of registers coupled to a first parallel port for interfacing with a processor bus of a host computer for transferring parallel data and control signals, said first plurality of registers providing said parallel data and said control signals to a first bus, wherein said first plurality of registers comprises a first-in, first-out (FIFO) register and a two port scratch register coupled to said processor bus and to said first bus for communicating said control signals between said processor bus and said first bus separately from said parallel data;

converting means coupled to said first bus for receiving said parallel data and said control signals and for converting said parallel data to serial data at a conversion rate, said converting means transferring said serial data to a serial port; and a second parallel port coupled to said first bus for interfacing with a second processing means to a transfer said parallel data, wherein said second processing means performs protocol conversion on said parallel data without reducing said conversion rate.

18. A circuit comprising:

a first plurality of registers coupled to a first parallel port for interfacing with a processor bus of a host computer for transferring parallel data and control signals, said first plurality of registers providing said parallel data and said control signals to a first bus, wherein said first plurality of registers comprises a first-in, first-out (FIFO) register and a baud generator register;

converting means coupled to said first bus for receiving said parallel data and said control signals and for converting said parallel data to serial data at a conversion rate, said converting means transferring said serial data to a serial port;

a second parallel port coupled to said first bus for interfacing with a second processing means to transfer said parallel data, wherein said second processing means performs protocol conversion on said parallel data without reducing said conversion rate; and a digital phase locked loop baud rate generator coupled to said first bus for recovering clock signals and for writing to said baud generator register via said first bus, wherein said host computer may also write to said baud generator register via said processor bus.

19. A circuit comprising:

a first plurality of registers coupled to a first parallel port for interfacing with a processor bus of a host computer for transferring parallel data and control signals, said first plurality of registers providing said parallel data and said control signals to a first bus, wherein said first plurality of registers comprises a first-in, first-out (FIFO) register and a dual port control register for receiving said control signals from said host computer via said processor bus and for passing said control signals via said first bus;

converting means coupled to said first bus for receiving said parallel data and said control signals and for converting said parallel data to serial data at a conversion rate, said converting means transferring said serial data to a serial port; and a second parallel port coupled to said first bus for interfacing with a second processing means to transfer said parallel data, wherein said second processing means performs protocol conversion on said parallel data without reducing said conversion rate.

20. A circuit comprising:

a first plurality of registers coupled to a first parallel port for interfacing with a processor bus of a host computer for transferring parallel data and control signals, said first plurality of registers providing said parallel data and said control signals to a first bus, wherein said first plurality of registers comprises a first-in, first-out (FIFO) register, a baud generator register, and a two port scratch register coupled to said processor bus and to said first bus for communicating said control signals between said processor bus and said first bus separately from said parallel data;

converting means coupled to said first bus for receiving said parallel data and said control signals and for converting said parallel data to serial data at a conversion rate, said converting means transferring said serial data to a serial port;

a second parallel port coupled to said first bus for interfacing with a second processing means to transfer said parallel data, wherein said second processing means performs protocol conversion on said parallel data without reducing said conversion rate, wherein said first plurality of registers further comprises an interrupt logic register coupled to said processor bus and to said first bus for providing interrupts to said host computer and to said second processing means when said parallel data and control signals are transferred to said first plurality of registers; and a digital phase locked loop baud rate generator coupled to said first bus for recovering clock signals and for writing to said baud generator register via said first bus, wherein said host computer may also write to said baud generator register via said processor bus.

* * * * *